(12) United States Patent
Van Der Putten

(10) Patent No.: US 8,300,928 B2
(45) Date of Patent: Oct. 30, 2012

(54) SYSTEM AND METHOD FOR LOCATING A TARGET REGION IN AN IMAGE

(75) Inventor: Ronald Van Der Putten, Marysville, WA (US)

(73) Assignee: Intermec IP Corp., Everett, WA (US)

( * ) Notice: Subject to any disclaimer, the term of this patent is extended or adjusted under 35 U.S.C. 154(b) by 952 days.

(21) Appl. No.: 12/359,197

(22) Filed: Jan. 23, 2009

(65) Prior Publication Data

US 2009/0190831 A1      Jul. 30, 2009

Related U.S. Application Data

(60) Provisional application No. 61/023,646, filed on Jan. 25, 2008.

(51) Int. Cl.
*G06K 9/00* (2006.01)
(52) U.S. Cl. ......... 382/165; 382/162; 382/167; 382/305
(58) Field of Classification Search .................. 382/162, 382/164, 165, 167, 274, 305; 348/453; 345/589–590, 593, 597, 598, 599, 600, 601, 345/602, 604, 605; 358/1.9, 520, 523
See application file for complete search history.

(56) References Cited

U.S. PATENT DOCUMENTS

| | | | |
|---|---|---|---|
| 2002/0176105 A1* | 11/2002 | Kawai et al. | 358/1.9 |
| 2006/0013454 A1* | 1/2006 | Flewelling et al. | 382/128 |
| 2006/0114263 A1* | 6/2006 | Moore | 345/592 |
| 2007/0036456 A1* | 2/2007 | Hooper | 382/274 |
| 2008/0127253 A1* | 5/2008 | Zhang et al. | 725/35 |

* cited by examiner

*Primary Examiner* — Ali Bayat
(74) *Attorney, Agent, or Firm* — Perkins Coie LLP

(57) ABSTRACT

A system and method for locating a target region in an image is disclosed. In one embodiment a method includes automatically locating a signature field in a target region of an image captured by a barcode reader, where the target region includes rectangular boundaries defined by graphical delimiters in the image. One embodiment of the method includes, generating a binary-colored image, optionally performing de-speckling, generating a search pattern comprising multiple search locations that spatially correspond with pixels in the image, identifying a darker-shaded pixel in the multiple search pixels as a candidate pixel that is a portion of one of multiple graphical delimiters, analyzing colors of neighboring pixels of the candidate pixel to compute a weight value of the candidate pixel, and/or saving the candidate pixel as a located graphical delimiter of multiple graphical delimiters if the weight value of the candidate pixel exceeds or approximates a weight threshold.

21 Claims, 14 Drawing Sheets (Before radial color-adjustment)

(After radial color-adjustment)

SYSTEM AND METHOD FOR LOCATING A TARGET REGION IN AN IMAGE

CLAIM OF PRIORITY

This application claims priority to U.S. Provisional Patent Application No. 61/023,646 entitled "System and Method of Image Capture of a Target Region", which was filed on Jan. 25, 2008, the contents of which are expressly incorporated by reference herein.

BACKGROUND

Signature capture technology has traditionally relied on the presence of a barcode on the packaging to provide information related to parameters of the imaging device for locating the signature field. For example, the angle, distance, and/or the location of the imaging device, such as a barcode scanner or other types of symbol readers, can be determined by scanning the barcode. Typically, the barcode is used as a reference point relative to the location of the signature field.

Furthermore, the signature field location and/or dimensions are generally manually entered by the user into the imaging device. For example, the user typically needs to enter the X and Y offsets as well as the height and width of the signature field into the imaging device for it to properly capture the signature field area. The combination of the reference location of the imaging device, imaging device parameters and/or the signature field location/dimensions allows the imaging device to capture the signature in the signature field.

However, the process tends to be exceedingly cumbersome since every label with signature fields of different areas and/or locations would require re-calibration to obtain a new set of parameters for the imaging device to perform a new computation to locate and effectively capture the signature field. In addition, the user would need to re-enter the location and dimensional data each time for each signature scan.

DETAILED DESCRIPTION

Figure 1A:
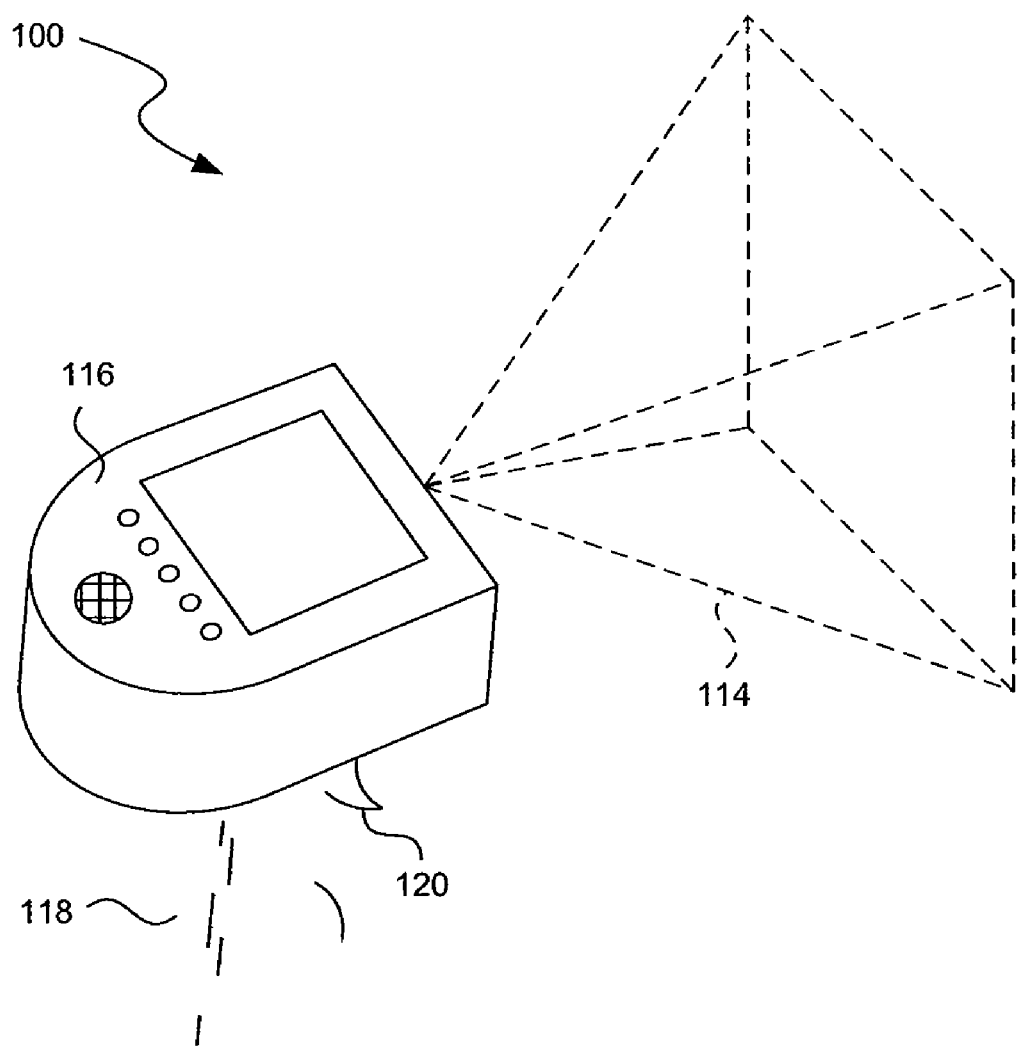
FIG. 1A illustrates an example of a symbol reader.

The following description and drawings are illustrative and are not to be construed as limiting. Numerous specific details are described to provide a thorough understanding of the disclosure. However, in certain instances, well-known or conventional details are not described in order to avoid obscuring the description.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

The terminology used in the description presented below is intended to be interpreted in its broadest reasonable manner, even though it is being used in conjunction with a detailed description of certain specific examples of the disclosure. Certain terms may even be emphasized below; however, any terminology intended to be interpreted in any restricted manner will be overtly and specifically defined as such in this Detailed Description section.

Embodiments of the present disclosure include systems and methods for locating a target region in an image.

The techniques involved in locating a target region in an image and subsequently capturing the image can be applied, for example, to locate and capture a target region of a signature field potentially containing a hand-written signature. Yet additional related applications related to locating a target region in an image are contemplated, including, by way of example but not limitation, identifying a predefined area or space in an image containing a target object for object detection and/or locating a target region delimited in space by delimiters for use in image processing or other machine vision techniques.

One aspect of the present disclosure involves employing delimiters (e.g., graphical delimiters or discrete delimiters) to define the boundaries of a target region (e.g., a target region containing a signature field or other target objects). In one instance, four delimiters are used at the four corners of a target region to define its four boundaries (e.g., rectangular, square, trapezoidal boundaries). Alternate numbers of delimiters can be used, and the target region can also be of any other shape or form convenient to the application in question. Generally, the form and shape of the delimiters are selected such that an imaging device or image capture device (e.g., a barcode reader, a symbol reader, a 2D symbol reader, and/or a laser scanner, etc.) can detect their presence and in some instances, the form factor (e.g., color, shape, size, etc.).

One aspect of the present disclosure involves generating a search pattern that has multiple search locations that emanate from approximately, a center portion of the image and towards the exterior portions of the image having the target region to be located. The search pattern is, in one embodiment, a search pattern (e.g., a spiral search pattern) in the form of, for example, the Archimedes' spiral.

The imaging device can periodically analyze pixels in the image that correspond in location to any of the search locations in the search pattern. The imaging device can subsequently determine the color, color intensity, and/or weight of the pixel. For example, if the delimiters of the boundaries of the target region are black, the imaging device can analyze the pixels to detect the ones that are black or approximately black. By following the search pattern to search for the delimiters, the number of pixels that need to be analyzed is significantly reduced. As a result, the system can identify the delimiters in a manner that is independent of the position of the imaging device with respect to the imaged unit.

One aspect of the present disclosure involves determining whether the detected pixels that match a color (e.g., a range of colors, a range of hues, a shade, etc.) are one of the delimiters that define the boundaries of a target region. For example, when a candidate pixel (e.g., a black pixel or a dark-shaded pixel) is found, the imaging device analyzes the color (e.g., color intensities) of surrounding pixels to determine a 'weight value' of the candidate pixel.

The pixel 'weight value' is a quantitative indicator of the number of surrounding pixels that has a color intensity that is similar to and/or substantially matches the color of the delimiters. Typically, a delimiter is considered as having been located when the weight value exceeds and/or approximates a weight threshold. In addition, a delimiter can be identified when the weight value falls within a weight range.

While the term "color" is used herein, it may represent intensity in monochrome, halftone, or grayscale images, as well images having multiple colors, and thus can represent a digital value associated with any pixel in a digitized image taken of an object to be analyzed.

In addition, in some instances, the image containing the target region to be located is initially converted to a binary-colored image, de-speckled, and/or intensity adjusted, to decrease the amount of noise in the image while searching for pixels that may be a portion of a delimiter.

Imaging System

FIG. 1A illustrates an example of a symbol reader 100.

The symbol reader 100 is, in one embodiment, provided for identifying, capturing, decoding, and/or reading one or more targets (e.g., a symbol (1D or 2D), other machine-readable symbols, a pixel reader, a target region, a signature field, a target object, etc.) from a target object or image.

The symbol reader 100 (e.g., 2D symbol reader, a machine-readable symbol reader) includes a head 116, a handle 118, and an actuator such as a trigger 120. While the trigger 120 is shown with a specific shape and in a specific location in the embodiment of FIG. 1A, other embodiments may employ different arrangements. For example, the trigger 120 can be embodied as a side-mounted finger trigger, top-mounted thumb trigger, button or key, touch screen, and other trigger arrangements. One embodiment further provides a proximity trigger, which uses optics, acoustics, or other mechanisms to determine proximity of an object to automatically activate without requiring a user to pull the trigger.

The symbol reader 100 can include a portable machine-readable symbol reader, a hand-held imaging device type device, a portable phone, a camera, a camera phone, and/or other suitable electronic device having the data reading capabilities described herein. Further, the symbol reader 100 can be any scanner such as a laser scanner but more likely comprising an image sensor including but not limited to a CCD sensor, a CMOS sensor, and/or a photodiode. It is appreciated that some embodiments are provided that may not necessarily have the same shape or identical features or identical use as the embodiments illustrated in the various figures.

In one embodiment, the reader may use one or more light sources suitably arranged to generate a desired size and shape of an illumination pattern. Examples of such light sources include laser light sources, light emitting diodes (LEDs), or other types of light sources that generate light that is visible to the user and that can be detected by a sensor. Ambient light may be used instead of, or to supplement, the illumination pattern for such image acquisition embodiments.

The techniques for imaging a target (e.g., an image, a target region, a signature field, a symbol (1D/2D machine-readable symbol), etc.) and locating a target region (e.g., signature field) on an image using the symbol reader 100 and other similar devices are further described with reference to FIG. 4-5.

Figure 1B:
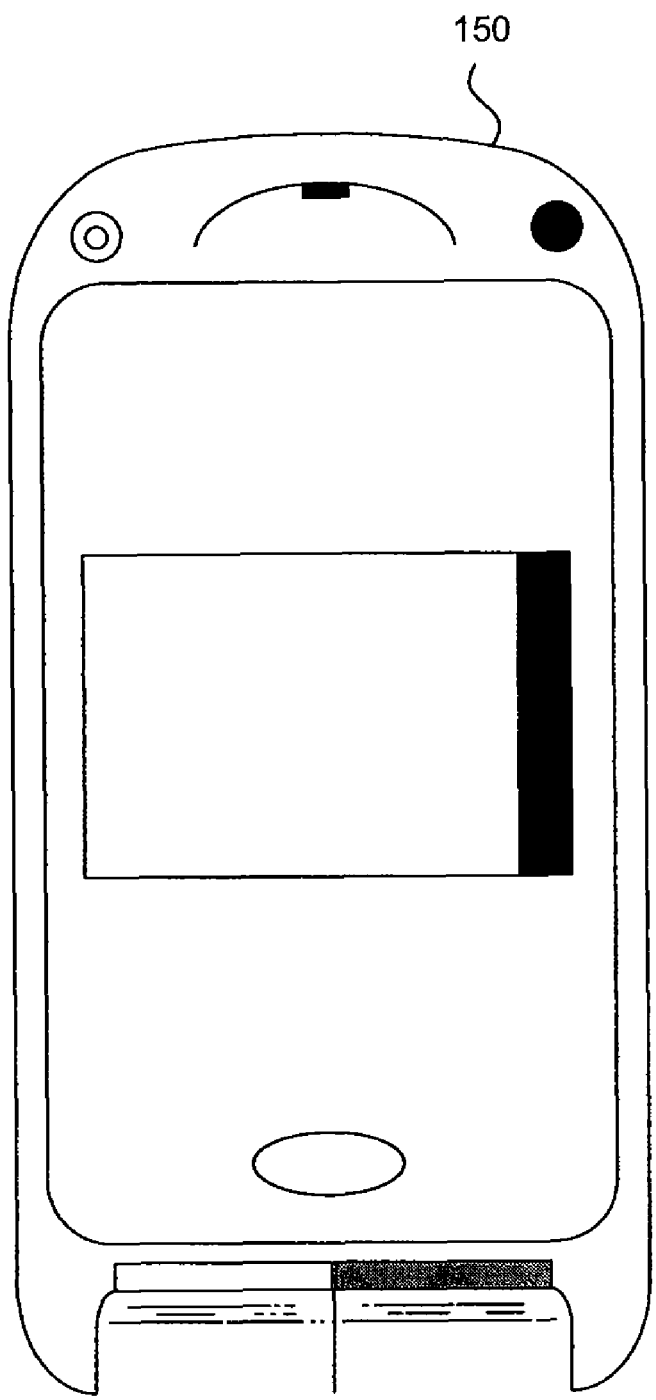
FIG. 1B illustrates an example of a portable phone or a similar device with symbol reading capabilities.

FIG. 1B illustrates an example of a portable phone 150 or other portable device (such as a PDA, a smartphone, a Blackberry, and/or a palmtop computer) with symbol reading capabilities, according to one embodiment.

The example portable phone 150 of FIG. 1B has data or symbol reading capabilities, for example, similar target reading functions described in association with the symbol reader of FIG. 1A. As shown, the portable phone includes an imaging portion (e.g., image sensor, an imaging unit, scanner, and/or camera) to scan a target (e.g., an image, a target region, a target object, a signature field, a machine-readable symbol, etc.). The target region or target object can then be detected and subsequently analyzed or decoded to locate the data and/or to retrieve the contents of the encoded data, as noted herein.

Figure 2A:
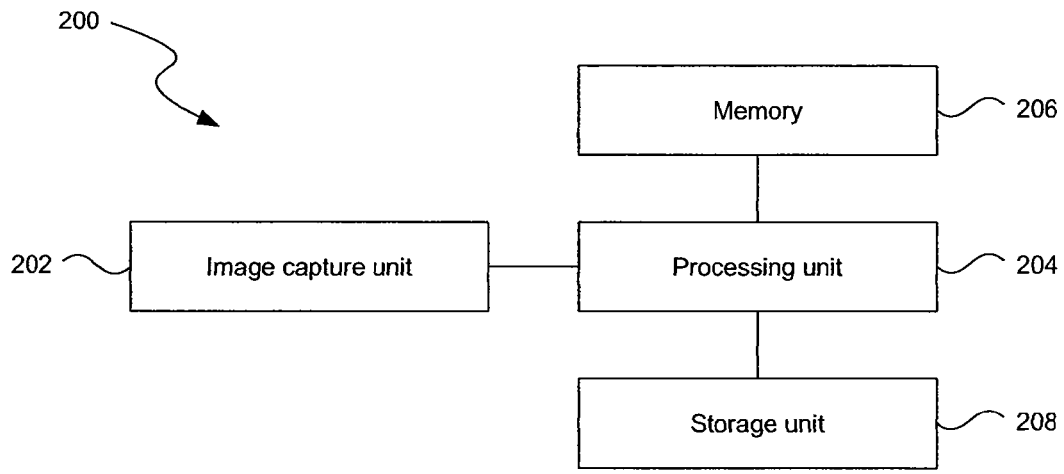
FIG. 2A is an example block diagram of a symbol reader.

FIG. 2A is an example block diagram of a symbol reader 200.

A target (e.g., an image, a target region, a signature field, a symbol, a machine-readable symbol, 2D barcodes, data matrices, QR codes, and/or the like codes, etc.) can be read using the symbol reader 200 by way of example but not limitation, a barcode reader. In one embodiment, the symbol reader 200 includes an image capture unit 202, a processing unit 204, a memory unit 206, and/or a storage unit 208. Additional or less units or modules may be included. The symbol reader 202 can be any combination of hardware components and/or software agents for capturing, reading, retrieving, processing, and/or storing a symbol.

For example, the image capture unit 202 can include an electro-optical device such as a laser scanner, rasterizing laser, wand-based optical transducer one- or two-dimensional CCD, semiconductor array, vidicon, or other area imaging device (e.g., 1D imaging device, 2D imaging device) capable of converting received light into electrical signals. The electro-optical device in the image capture unit 202 can also include a light source such as an LED, flash bulb, infrared light source, or other light-emitting element. As used generally herein, the term "reader" refers to any device capable of converting modulated light received from a target into electrical signals. Any convenient and/or known reader may be suitable for use in the present disclosure.

One embodiment of the symbol reader 200 further includes a processing unit 204. The data read from the image capture unit 202 can be input to a processing unit 204. The processing unit 204 can include one or more processors, CPUs, microcontrollers, FPGAs, ASICs, DSPs, or any combination of the above. Data that is input to the symbol reader 200 can be processed by the processing unit 204 and output to display and/or output via a wired or wireless connection to an external computer, such as a host or server computer by way of a communications component.

One embodiment of the symbol reader 200 further includes a memory unit 206 and a storage unit 208. The memory unit 206 and a storage unit 208 are, in some embodiments, coupled to the processing unit 204. The memory unit can include volatile and/or non-volatile memory.

In identifying a target region or target object, the processing unit 204 can perform one or more algorithms for locating a target region in an image and/or subsequently capturing the target region. The target region to be located typically has boundaries that are defined by delimiters (e.g., graphical delimiters or discrete delimiters). In some instances, the target region can be rectangular or square and delimited by four discrete delimiters. For example, the delimiters can include four black markers at the corners of a rectangular region. In some embodiments, the processing unit 204 generates a search having multiple search locations that spatially overlap with pixels in the image. In one embodiment, the search pattern is substantially spiral and comprises search locations that emanate from the center portion of the image towards the outer portion of the image.

The search pattern can provide a guide for searching for the delimiters of the target region in the image. For example, the processing unit 204 can analyze each search pixel in the image that correspond or approximately correspond in location to the multiple search locations. Each pixel can be analyzed to determine if it is one of the delimiters. Based on, for example, the color, the weight of each pixel, or a combination thereof. For example, if the delimiting delimiters are dark-shaded (e.g., black, brown, and the like colors), the image is scanned for dark-shaded pixels in the image that spatially correspond to the search locations.

In one embodiment, when a dark-shaded pixel (e.g., or any pixel having a color within a color range) is detected at a search location, the dark-shaded pixel can be identified as a candidate pixel that corresponds to (or is a portion of) a delimiter. The processor 204 can then analyze the color of the candidate pixel and its neighboring pixels to compute a weight value of the candidate pixel. The weight value of the candidate pixel is indicative of the number of neighboring pixels also having a color or hue within the color range. In general, the delimiters can have a weight value that corresponds to a size or size range. In one embodiment, when the weight value of the candidate pixel exceeds or approximates a weight threshold, the candidate pixel is then identified and further saved as a located delimiter.

The image can subsequently be scanned to locate additional delimiters in a similar fashion until each of the graphical delimiters has been located. In some instances, the processing unit 204 may perform various image processing subroutines on the image prior to pixel scanning to search for delimiters. The image processing subroutines that can be performed include, by way of example but not limitation, de-speckling, color adjustments, and/or image intensity modifications. For example, the image may be converted into a binary-colored image (e.g., black and white). In addition, the image intensity may be increased radially. These subroutines are further described with further reference to the examples of FIG. 2B-3C and graphically illustrated with reference to the example of FIG. 5A-5F.

In one embodiment, once the delimiters have been used to locate the target region in the image, the processing unit 204 may normalize the area of the target region to a target size. The normalizing process is described with further reference to the examples of FIG. 2B-3C and FIG. 8.

Figure 2B:
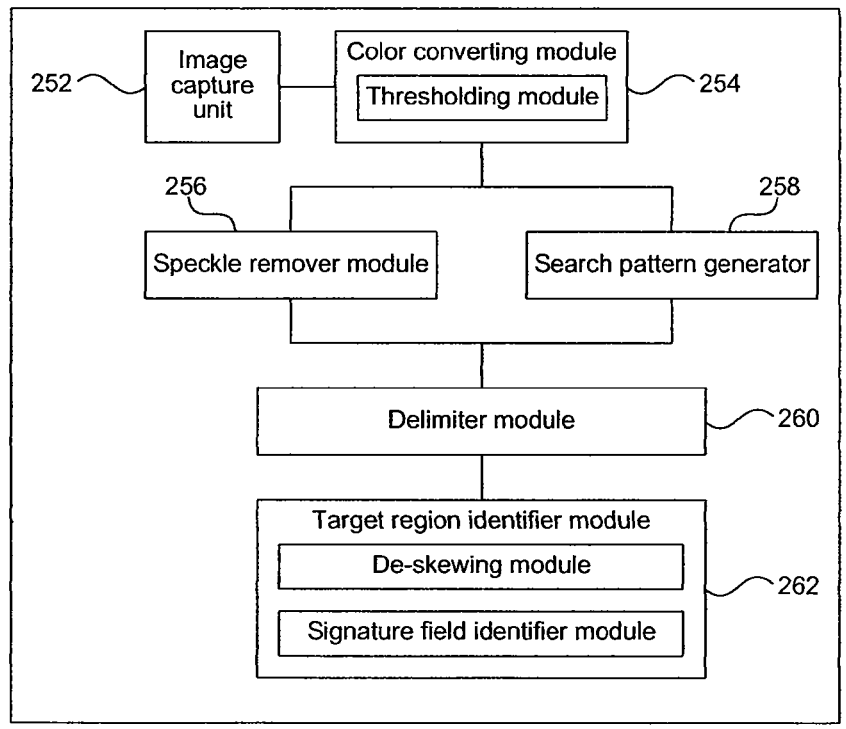
FIG. 2B is an example block diagram of an apparatus for identifying a target region in an image.

In some embodiments, any or all of the functions described herein of the target region capture capabilities and additional image processing functions of the processing unit can be performed in one or more of, or a combination of software and/or hardware modules external or internal to the processing unit, in any known or convenient manner, as illustrated with further reference to FIG. 2B. In particular, with reference to the symbol reader 200 in the example of FIG. 2A, the target region search and capture functions including search pattern generation can be performed via any of the combinations of modules not illustrated in the control subsystem, for example, the processing unit 204, and/or the memory unit 206.

FIG. 2B is an example block diagram of an apparatus 250 for identifying a target region in an image.

In the example of FIG. 2B, the apparatus 250 includes an image capture unit 252, a color converting module 254, a speckle remover module 256, a search pattern generator 258, a delimiter module 260, and/or a target region identifier module 262. In one embodiment, the color converting module 254 includes a thresholding module. The target region identifier module 262 can include a de-skewing module and/or a signature field identifier module. Additional or less modules may be included. The apparatus 250 may be communicatively coupled to the image capture unit 252. In some embodiments, the image capture unit 252 may be partially or wholly internal to the apparatus 250.

One embodiment of the apparatus 250 includes the image capture unit 252. The image capture unit 252 can be any combination of hardware components and/or software agents able to detect, capture, save, modify, process, and/or discard an image. In general, the image capture unit 252 has the same or similar function as the image capture unit 202 of FIG. 2A.

One embodiment of the apparatus 250 further includes the color converting module 254. The color converting module 254 can be any combination of hardware components and/or software agents able to change the color, shade, or hue of an image or any portion/pixel of an image.

The color converting module 254 can convert the colors in an image to a set of colors within a color range. In one embodiment, the color converting module 254 is operable to generate a binary-colored image from an image. The binary-colored image can include darker-shaded pixels and lighter shaded pixels. For example, the darker-shaded pixels may be black or shades of gray, brown, blue, or other darker colors, while the lighter-shaded pixels may be white, off-white, beige, light yellow, or other lighter colors, all being represented by pixel intensity or color values.

The color converting module 254 is generally capable of converting the colors or a portion of colors of an image. In addition, the color converting module 254 can convert colors of specific portions or pixels of an image that meet criteria. For example, the color converting module 254 is able decrease the darkness in color at or near the edge/boundary portions of the image. This decrease in color can be implemented using radial adjustment where the image is increasingly lightened with increasing radius from the center portion of the image. The process of decreasing color darkness near image edges could be beneficial for images captured using an imaging device such as a laser or barcode scanner since these devices tend to capture images with darker edges. A graphical depiction of radial adjustment using a radial threshold algorithm is illustrated with further reference to FIG. 5A.

In a further example, the criteria for color conversion can include a color threshold determined using the colors that are present in the originally captured image. For example, an average color of the image could be used to compute a threshold. The average color may also be used as the threshold. In generating the binary-colored image, pixels with an original color darker than the threshold or average color can be converted to the darker shade and the pixels lighter than the threshold can be converted to a lighter shade. The color histogram for computing the average color and/or the threshold color of an image is illustrated with further reference to FIG. 5D. In one embodiment, the color converting module 254 includes a thresholding module. The thresholding module can compute the thresholds used for color conversion.

One embodiment of the apparatus 250 further includes the speckle remover module 256. The speckle remover module 256 can be any combination of hardware components and/or software agents able to detect, identify, locate, mark, and/or remove speckles or similar optical/digitized noise from an image.

In identifying speckles in a binary-colored image with darker-shaded pixels and lighter-shaded pixels, a darker-shaded pixel can be detected and identified as a speckle when its neighboring pixels are predominantly of a lighter shade or fall within a color spectrum about the lighter shade. For example, a pixel can be identified as a speckle pixel if it is dark shaded and most of its neighbors are light shaded. As described in more detail below. the speckle remover module 256 can then perform de-speckling by removing the speckle pixel. For example, the speckle pixel can be removed by converting a darker-shaded pixel in the binary-colored image to a lighter shade (e.g., white value).

Alternatively, it is contemplated that applications exist where the lighter-shaded pixels are identified as a speckle pixel when its neighboring pixels are predominantly dark-shaded. The speckle remover module 256 can then similarly perform de-speckling by converting the lighter-shaded pixel to a darker shade.

One embodiment of the apparatus 250 further includes the search pattern generator module 258. The search pattern generator module 258 can be any combination of hardware components and/or software agents able to generate search patterns having search locations that spatially correspond to pixels in an image.

The search pattern can be used to search for target objects in an image. The target objects can be, for example, delimiters that define the boundaries of a target region to be located in the image. As described in more detail below, by searching the image at the search locations defined by the search pattern, the number of pixels that are analyzed can be reduced since not every pixel needs to be analyzed. In general, the search pattern can be any form or shape. In one embodiment, the search pattern is a search pattern (e.g., a spiral search pattern) such as an Archimedes' spiral. Note that in some instances, the search pattern is not generated in the center portions and the edges of the image. By widening the radius of the center portion, the number of search locations can be reduced thus further expediting the search process.

One embodiment of the apparatus 250 further includes the delimiter module 260. The delimiter module 260 can be any combination of hardware components and/or software agents able to analyze pixels to detect and/or identify target objects using delimiters.

In one embodiment, the target objects are delimiters (discrete delimiters or graphical delimiters) that define the boundaries of a target region in an image. The delimiter module 260 can be coupled to the search pattern generator and the speckle remover module 256 to receive a de-specked image with search patterns. For example, the delimiter module 260 is able to analyze the color of a target pixel located at or near a search location. The delimiter module 206 can then analyze the color of the target pixels that correspond in or substantially (approximately) corresponds or overlaps in location with the search locations in the search pattern. The delimiter module 260 can mark the target pixel as a candidate pixel if it is of a predetermined shade or color (e.g., a dark shade if the delimiters are known to be of a darker color).

In addition, the delimiter module 260 analyzes the colors of the neighboring pixels of the candidate pixel to determine whether the target pixel corresponds with (or e.g., is a portion of) a delimiter of the target region. A weight value of the candidate pixel can be computed using the colors of the neighboring pixels. The candidate pixel can then be identified and/or saved by the delimiter module 260 as a located delimiter when the weight value exceeds or approximates a weight threshold. In addition, the candidate pixel can also be identified and/or saved by the delimiter module 260 as a located delimiter when the weight value falls within a weight range.

The delimiter module 260 can similarly analyze each pixel that spatially corresponds to a search location to locate additional delimiters defining the boundaries of the target region. In one embodiment, the delimiter module 260 searches for additional delimiters until each delimiter has been located. For example, in the situation where four delimiters are used to define the boundaries of a target region, the delimiter module 260 may continue analyzing the pixels until all four delimiters have been located.

In one embodiment, one of the delimiters has a different weight value (e.g., size) than the other delimiters. The delimiter module 260 can detect the delimiter with the different weight value, for example, to facilitate determination of the orientation of the target region as captured in the image to perform any subsequent processing, if necessary.

One embodiment of the apparatus 250 further includes the target region identifier module 262. The target region identifier module 262 can be any combination of hardware components and/or software agents able to detect, locate, identify, capture, save, store, and/or modify a target region.

In one embodiment, the target region includes a signature field and the area of the target region is such that that a hand-written signature fits substantially or completely within the boundaries of the target region. The target region identifier module 262 can be coupled to the delimiter module 260 to determine the locations of the identified delimiters. For example, the target region identifier module 262 may receive location data (e.g., coordinate data or pixel location data) of the identified delimiters. The target region identifier module 262 can then use any portion of the identified delimiters to identify the target region.

For example, if less than all delimiters are identified, the locations of the remaining delimiters may be approximated and used to find the target region. In particular, the shape and form of the target region can be used for computing locations of delimiters that had not been found. For example, in the case of a rectangular target region where three of the four delimiters are found, the position of the fourth delimiter can be determined via geometric computations. The target region can thus be identified by the target region identifier module 262.

One embodiment of the target region identifier module 262 includes a signature-field identifier module. For example, if the target region includes a signature-field having a hand-written signature, the signature field identifier can identify and capture the signature field and the signature.

One embodiment of the target region identifier module 262 further includes a de-skewing module. The de-skewing module can correct for the orientation of the target region as captured. For example, the de-skewing module can determine a current orientation of the signature field using the delimiter with the different weight value and perform a rotation on the target region or image such that the target region is becomes oriented in the desired orientation. In addition, the de-skewing module is operable to de-skew the target region and/or resize the target region to a target size defined by a target height and target width. In one embodiment, the de-skewing is performed by initially determining a left height and a right height of the target region as captured and collecting x-coordinate and y-coordinate data of a set of lines along the width (length) of the target region. The x and y-coordinate data of the lines in the target region are used for re-sampling the pixels such that a de-skewed image can be created.

Delimiter Search and Target Region Detection

Figure 3A:
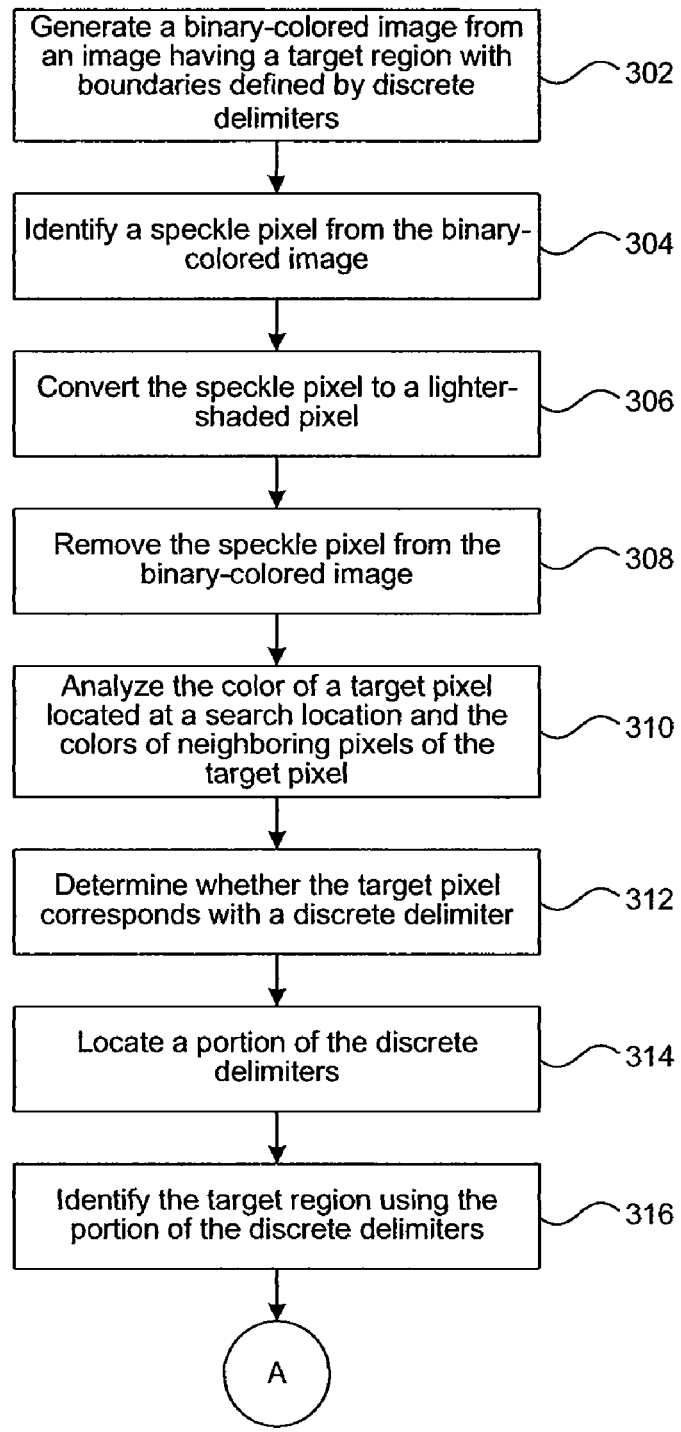
FIG. 3A illustrates an example process flow for using delimiters to identify a target region in an image captured by an imaging device.

FIG. 3A illustrates an example process flow for identifying a target region in an image captured by an imaging device.

The image can be captured by any imaging device, for example, a machine-readable symbol reader, such as those illustrated in FIG. 1-2. The full-sized version image includes a target region area to be identified. The target region may include an image of a target object (e.g., a signature) to be detected and/or otherwise captured for further processing. Examples of images captured with an imaging device where target regions are to be located are illustrated with further reference to FIG. 4A-4B In process 302, a binary-colored image is generated from an image having a target region with boundaries defined by discrete delimiters. An example color histogram for color conversion is illustrated with further reference to FIG. 5D and a binary-colored image is illustrated in FIG. 5E. The target region can be a signature field and the area of the target region can be dimensioned such that a hand-written signature fits substantially (approximately) or completely within the boundaries of the target region. In one embodiment, the darkness in color at or near edge portions of the image is decreased radially prior to generating the binary-colored image. For example, the portions of the image that are radially further away from the center portion can be increasingly lightened. Radial intensity-adjustment is described below with further reference to FIG. 5A and versions of an image before and after radial color adjustment are graphically illustrated in FIGS. 5B and 5C respectively.

In process 304, a speckle pixel is identified from the binary-colored image. The speckle pixel can be detected by identifying a darker-shaded pixel having a predetermined number of neighboring pixels of color shades within a color spectrum (color range). In one embodiment, unwanted speckles are identified based on the weights of the pixels in the image. The weight is a quantified descriptor indicating the number of pixels surrounding a detected pixel having a color within a predetermined range.

For example, in a binary-colored image that is black and white, an unwanted object may be identified by searching for black pixels with a weight below a predetermined value (or having a number of black surrounding pixels below the predetermined value) within the eight surrounding or neighboring pixels, since black pixels with a larger weight may indicate that the detected object is a delimiting marker.

The de-speckling or anti-speckling process may further remove unwanted objects in the image prior to scanning the image for delimiting delimiters. De-speckling can be performed in one or more known and/or convenient methods. In process 306, the speckle pixel is converted to a lighter-shaded pixel. In process 308, the speckle pixel is removed from the binary-colored image when it is converted to the lighter-shaded color that blends in with the majoring of the neighboring pixels. For example, de-speckling can be performed by converting unwanted objects to white, for the example of black indicia on a generally white background image. An example of a speckled image is illustrated with further reference to FIG. 5E.

Note that in some applications, speckles may comprise of lighter shaded pixels instead of darker-shaded pixels as well. FIG. 5F depicts an example of the binary-colored image 550 after de-speckling.

In one embodiment, a search pattern having a set of search locations that includes multiple search locations can be generated. The search pattern generally comprises search locations emanating from a center portion of the image towards the exterior portions of the image. The search pattern can, in some embodiments emanate from the center of the image without omitting substantial amounts of image area. Generally, the distance between any two neighboring search locations in the search pattern may be less than the distance between the delimiters of the target region boundaries.

In some embodiments, if information about the delimiters, size of target region, and/or position of the target region is known, the space that the search pattern occupies may be modified to further decrease scan time by decreasing the number of pixels to be analyzed. For example, if the target region is of a known size, the search pattern (e.g., a spiral search pattern) can be generated for portions of the image omitting the edges and the center of a predetermined radius. Search patterns generated with omitted regions of varying sizes are illustrated with further reference to the examples of FIG. 6A-6B.

In one embodiment, the search pattern is a spiral search pattern. Dimensions of the spiral search pattern are generally initially determined by the size (e.g., width and height) of the acquired image. When a larger or smaller image is used, each spiral point can be re-scaled to fit the new image dimensions. The search pattern can be used as a road map for locating one or more of the delimiters in the captured image, beginning with an initial search point at a more central portion of the search pattern.

In process 310, the color of a target pixel located at a search location and the colors of neighboring pixels of the target pixel are analyzed. A discrete delimiter is typically identified by analyzing a target pixel at the current point in the search pattern to determine whether a color of the target pixel falls within a known range of colors of the delimiters. When a match is found, the weight of the target pixel is determined using the neighboring pixels. For example, the system searches neighboring pixels in the stored image to see if they have the same/similar color or value. The system may analyze the stored image in at least one predetermined direction from the current pixel until an edge is detected, and then "walks" the edge to determine the outer boundaries of a detected shape in the image.

A threshold may be applied to stop walking the edge to avoid undue or unnecessary image analysis of large shapes unrelated to the desired delimiters. The pixel weight can, in one embodiment, be compared to a weight threshold to determine whether the target pixel corresponds with (e.g., is a part of) a discrete delimiter if the weight value is within a weight range or exceeds/approximates a weight threshold, as in process 312. For example, while the de-speckling should have eliminated much optical noise in the stored image, stray spots or undesired marks could mistakenly be interpreted as one of the delimiters. Thus, upper and lower thresholds help ensure that the current pixel and detected shape are larger than stray spots/optical noise, yet smaller than large shapes (e.g. a large bar of a barcode).

In addition, the approximate radius of the discrete delimiter can be determined (e.g., measured and/or calculated). Spatial information about each identified delimiter is typically stored. The spatial information of a discrete delimiter can include, by way of example but not limitation, location information (e.g., coordinate data, pixel data, location of center), sizing information (e.g., radius, number of pixels), proportional spacing between delimiters (e.g., ratio of width between left and right pairs of delimiters versus length between top and bottom pairs of delimiters), and/or weight information (e.g., number of surrounding pixels having a color that falls within a predetermined range.). If the weight of the matching pixel does not exceed the predetermined threshold, the process continues following the search pattern to identify additional target pixels.

In other words, the system, in one embodiment, operates in a search pattern and periodically, along that pattern, analyzes a pixel in a de-spectacled image to see whether it is black or otherwise dark-shaded, determines if a dark-shaded pixel falls within one of the delimiters, and then determines the location of discrete delimiters. If the shape appears to correspond to a predetermined shape, then the routine flags that delimiter and continues on this spiral pattern to look for subsequent delimiters.

In process 314, a portion of the discrete delimiters are located. Additional discrete delimiters can be searched for until each of the set of discrete delimiters is found. When each discrete delimiter has been found, the target region can be identified and subsequently stored in the captured image, in process 316. For example, once all four discrete delimiters of the target region have been found, then the routine ends. If, however, at the end of the spiral pattern, only three dots have been found, or if more than four have been found, an alternative embodiment either fills in the missing discrete delimiter by using geometric formulas to determine the location in a rectangle or trapezoid, or eliminating the spurious points under a similar technique.

Figure 3B:
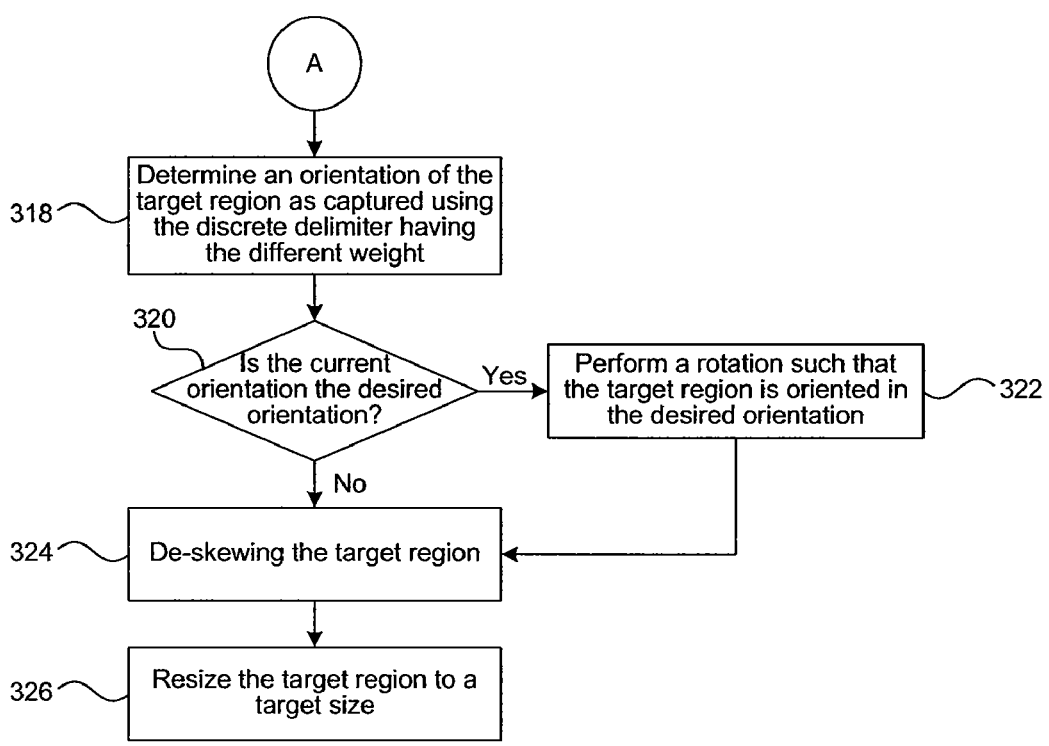
FIG. 3B illustrates an example process flow for correcting the target region for distortion.

FIG. 3B illustrates an example process flow for correcting the target region for distortion.

The captured image can be corrected for view distance, view angle, rotation, etc. To correct for distortion in the target region image, the orientation of the target region is initially determined. Orientation can be indicated and identified via one or more of known and/or convenient methods. For example, a delimiter may be modified in shape and/or otherwise modified in form (e.g., size, color, etc.) to indicate a particular position of the target region area (e.g., the largest marker may indicate the top left corner, etc.).

In process 318, the orientation of the target region as captured is determined using a discrete delimiter having a different appearance (e.g., weight, size, color, and/or shape) than the other delimiters. In one embodiment, the set of discrete delimiters includes four discrete delimiters and one of the set of discrete delimiters has a different weight value than the other discrete delimiters. The discrete delimiter having the different weight value can be used to indicate orientation of the target region. For example, the different delimiter can be used to detect a particular corner (e.g., the lower right, the upper left, etc.) of the target region. In addition, an extra marker can be added or left out to indicate the orientation of the area.

In process 320, it is determined whether the current orientation is the desired orientation. If the current orientation is not the desired orientation, a rotation is performed in process 322 such that the target region is oriented in the desired orientation. If the current orientation is the desired orientation, no rotation is performed.

Figure 8:
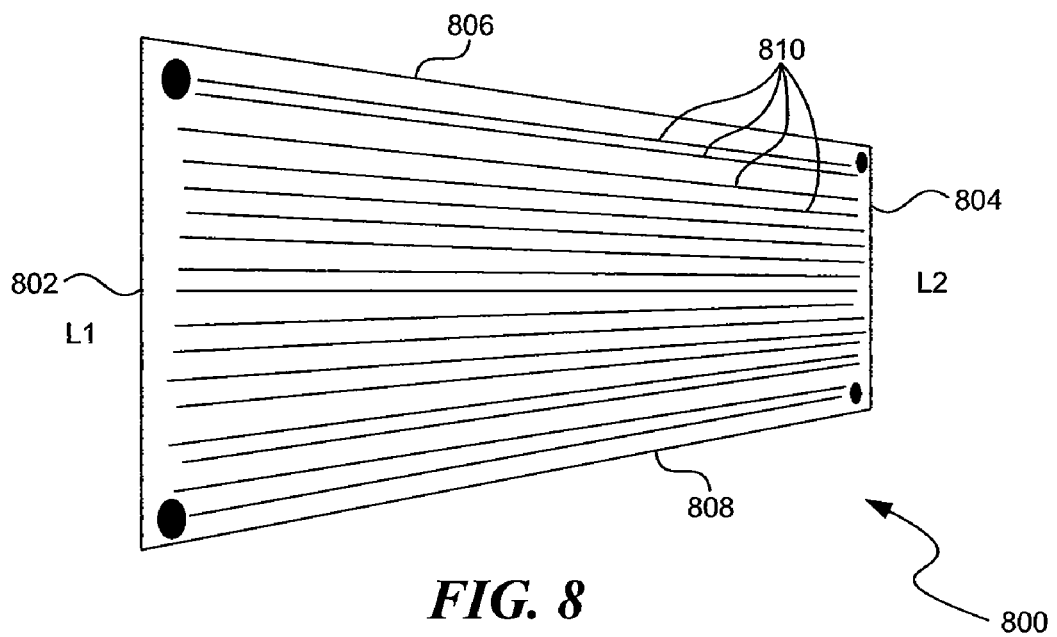
FIG. 8 depicts an example of a target region having boundaries defined by four delimiters that suffers from perspective distortion.

In some instance, if the image is skewed (e.g., the image has opposite sides with different widths or lengths), the system normalizes the length of the shorter edge height to the longer edge height to de-skew the target region, in process 324. FIG. 8 depicts an example of a captured target region 800 that suffers from perspective distortion having boundaries 802, 804, 806, and 808 defined by four delimiters. In FIG. 8, L2 804 is divided by L1 802 to perform the normalization. In de-skewing a square or rectangular target region, the number of pixels and their x and y-coordinates of the two heights L1 802 and L2 of 804 of the target region are collected to compute the number of points on each of the two height edges. The ratio RH1 and RH2 of the number of x and y-coordinates between each of the two height edges L1 and L2 and a target height Hf can also be determined (RH1=L1/Hf and RH2=L2/Hf).

The coordinate data of pixels of the lines 810 along the length of the target region 800 can be collected and sampled such to fit in the target height Hf. For example, the target region 800 can be normalized to the target size (e.g., in area and dimensions) by resampling the each line 810 based on the ratio RH1 and RH2 of the number of points along the two heights L1 and L2 of the edges 802 and 804.

In addition, the system can determine dimensions of the captured image area enclosed by the delimiters (e.g., four delimiters). The captured image area can be determined via one or more known and/or convenient techniques, including but not limited to, counting the number of pixels (or computing/measuring the distance) between each delimiter and performing arithmetic computations to obtain an approximation of the enclosed area.

In process 326, the target region is resized (zoomed) to a target size defined by a target width and target height. The target image area has the target size and dimensions that the captured image area is to be converted to. The target size may be determined by user designation or automatically determined (e.g., based on default setting).

Finally, the system can now identify more accurately where on the digitized image a signature-field is to be found based on the identified and transformed location of the delimiters. The system can perform additional processing, such as, identifying in the original grey scale image a signature within four identified delimiters. That signature can be copied in any format (e.g., JPEG, PDF, etc.), and forwarded on to others, such as pasted within an email, published to a website, etc. Note that the invention need not apply only to signature capture, but can also be used in any variety of image processing or machine vision techniques to identify target regions within an image.

Figure 3C:
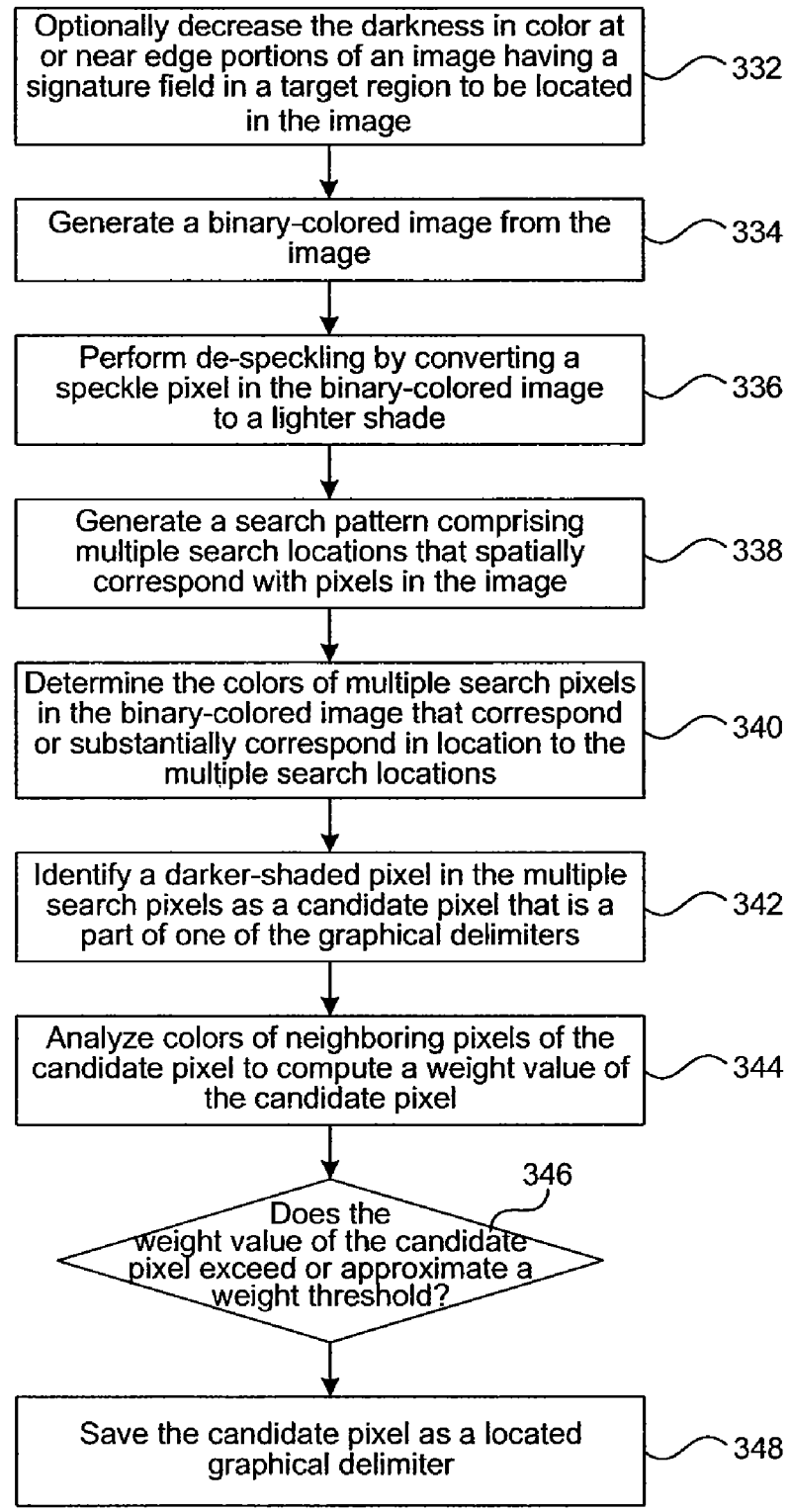
FIG. 3C illustrates an example process flow for using delimiters to automatically locate a signature field in a target region of an image captured by a barcode reader.

FIG. 3C illustrates an example process flow for automatically locating a signature field in a target region of an image captured by a barcode reader.

In process 332, the darkness in color is optionally decreased at or near edge portions of an image having a signature field in a target region. In one embodiment, the target region includes boundaries defined by graphical delimiters in the image. In process 334, a binary-colored image is generated from the image. The binary-colored image can include darker-shaded pixels and lighter shaded pixels. The image may be the raw captured image or the image with lightened edges.

In process 336, de-speckling is performed by converting a speckle pixel in the binary-colored image to a lighter shade. The speckle pixel is identified when a specified number of neighboring pixels of a darker-shaded pixel are of the lighter shade or fall within a color spectrum about the lighter shade. In one embodiment, eight neighboring pixels are analyzed and if five or more neighboring pixels are of the lighter shade (e.g., white) or fall within a color spectrum about the lighter shade, then the darker-shaded pixel (e.g., black) is converted to a lighter-shaded pixel (e.g., white). In process 338, a search pattern comprising multiple search locations that spatially correspond with pixels in the image is generated.

In process 340, the colors of multiple search pixels in the binary-colored image that correspond or substantially correspond in location to the multiple search locations are determined. In process 342, a darker-shaded pixel in the multiple search pixels is identified as a candidate pixel that is a portion of one of the graphical delimiters.

In process 344, the colors of neighboring pixels of the candidate pixel are analyzed to compute a weight value of the candidate pixel. In process 346, it is determined whether the weight value of the candidate pixel exceeds or approximates a threshold value. Similarly, it may be determined whether the weight value is within a weight range. If so, in process 348, the candidate pixel is saved as a located graphical delimiter. Additional graphical delimiters can be searched for until each of the graphical delimiters have been located and used for locating the signature field in the target region.

Figure 4A:
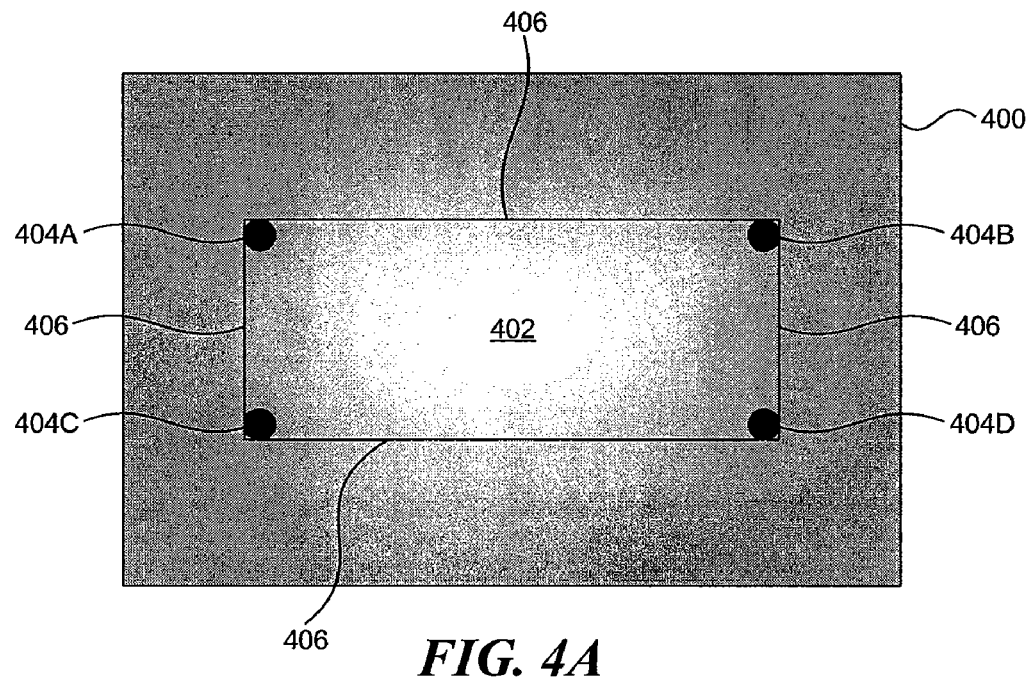
FIG. 4A depicts an example of a target region in an image having boundaries defined by discrete delimiters.

FIG. 4A depicts an example of a target region 402 in an image 400 having boundaries 406 defined by discrete delimiters 404A-D.

The example of image 400 is darker at the edges. In some instances, the edge effect may be due to artifacts from the reader employed to capture this image (e.g., machine-readable symbol reader). Edge effects such as this may be compensated for by radially adjusting the intensity on the captured image since the edge effects generally increase with radial distance from the center of the captured image, as further illustrated with reference to the example of FIG. 5A.

Figure 4B:
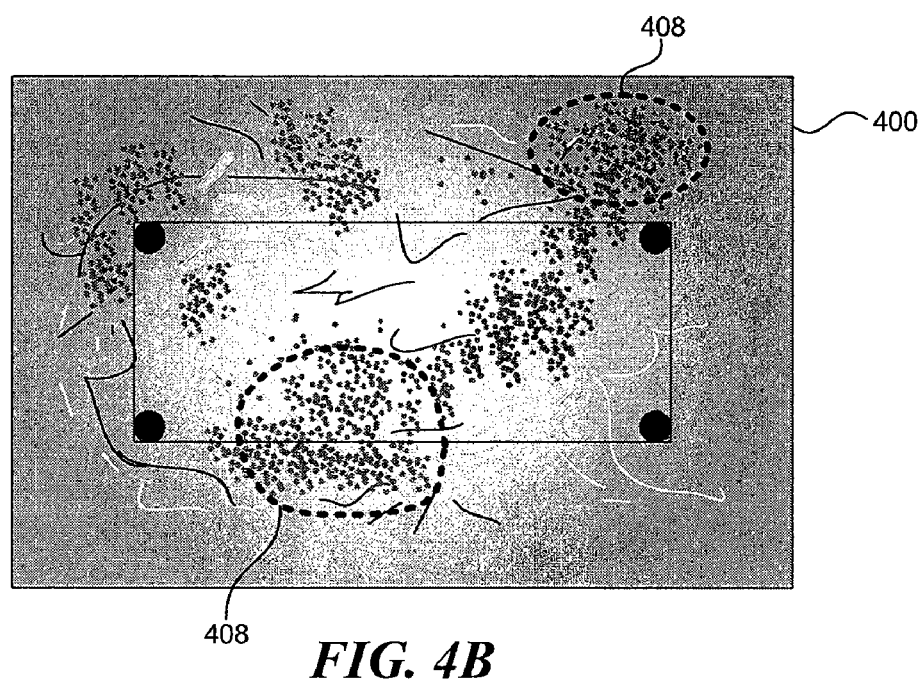
FIG. 4B depicts an example of a target region having boundaries defined by discrete delimiters in an image with speckles and other unwanted objects/lines.

FIG. 4B depicts an example of a target region having boundaries defined by discrete delimiters in an image 400 with speckles 408 and other unwanted objects/lines.

The speckles 408 and other unwanted objects/lines may be caused by various artifacts or scratches/other defects of the imaging device/lens combination of the reader employed to capture this image. In order to facilitate increased accuracy with identification of delimiters, the image 400 can be converted to a binary-colored image (e.g., black and white image) prior to performing the search. The conversion is, in some embodiments, facilitated by generating a color histogram of the captured image. The color conversion process is described with further reference to the example of FIG. 5D.

Figure 5A:
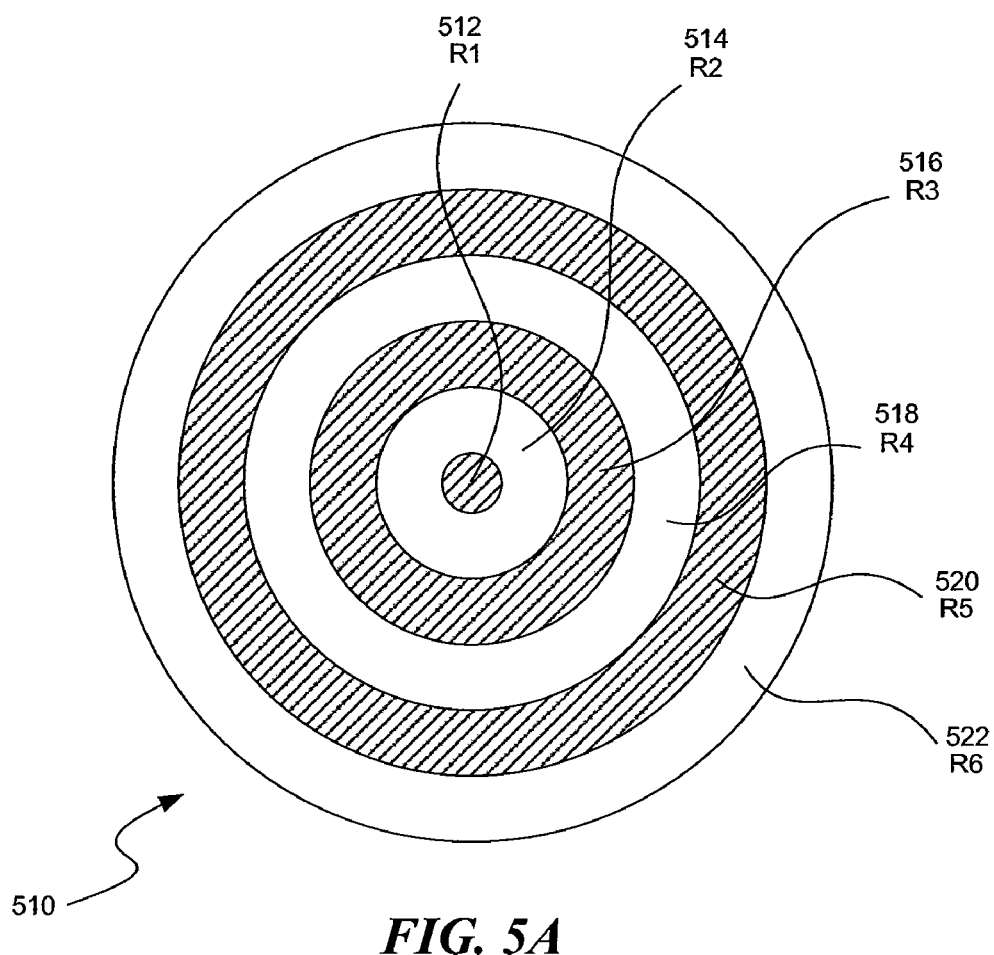
FIG. 5A depicts an example diagram showing how a radial threshold algorithm is applied for radial adjustment of image (color) intensity.
Figure 5B:
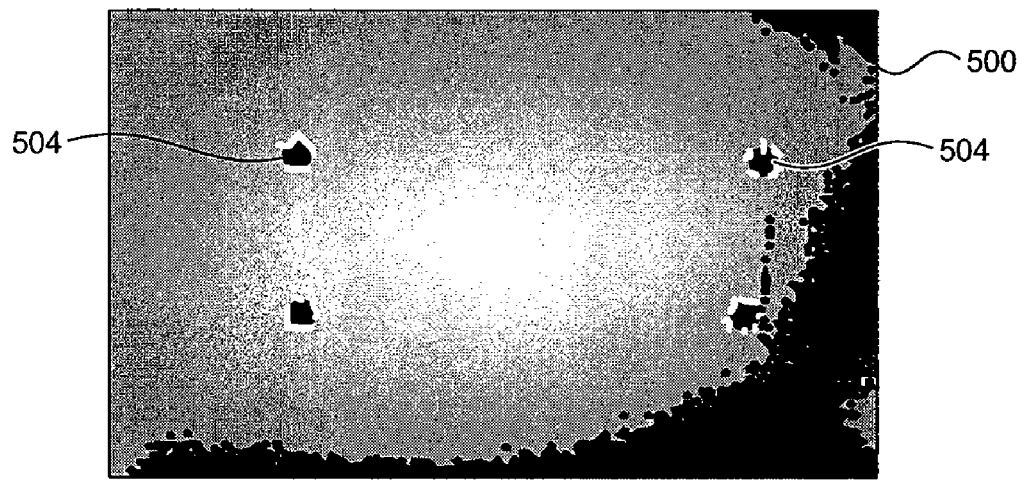
FIG. 5B depicts an example of an image captured by an imaging device before radial adjustment of image (color) intensity has been performed.
Figure 5C:
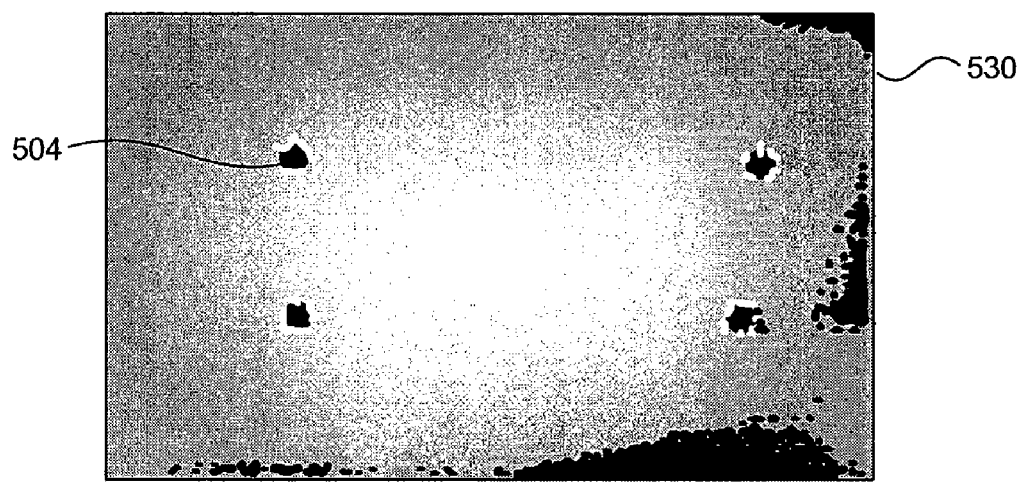
FIG. 5C depicts an example of an image that has undergone radial intensity adjustment.

FIG. 5A depicts an example diagram 510 showing how a radial threshold algorithm can be applied for radial adjustment of image (color) intensity of the image 500 of FIG. 5B.

Images captured by imaging devices such as scanners or barcode readers may, in some instances be darker towards the edges of the image, which may be due to inferior lenses or other optics. In this situation, the edge darkening effect can be corrected for by lightening the edges of the image so that the apparatus automatically and incrementally lightens pixels around the edges of the stored image. In other words, pixels within a center portion of the image aren't changed, but gradually moving outward from that center portion, pixels are increasingly "brightened" or increased in intensity. In one embodiment, the degree of intensity adjustment is proportional to the radial distance from the center of the image. In other words, pixels with a larger radial distance from the image center are lightened more than pixels that are radially closer to the image center.

Intensity adjustment variation with the radial distance can take upon one or more of many quantitative relations, including, but not limited to, linear variation, quadratic variation, exponential variation, etc. In one embodiment, an intensity adjustment parameter is assigned to each pixel. The intensity adjustment factor depends on the distance between the image center and the pixel for which intensity is to be adjusted, for example, on a semi-logarithmic style, although additional quantitative variations are contemplated.

An image can, in some embodiments, be divided into concentric rings R1, R2, R3 ... of predetermined widths as a basis for radial intensity adjustment. For example, the pixels contained in each ring portion can have a predetermined intensity adjustment factor. The intensity adjustment factor generally increases with the radial distance of the circular ring from the image center.

FIG. 5B depicts an example of an image 500 captured by an imaging device before radial adjustment of image (color) intensity has been performed. The image contains four delimiters 504 enclosing the boundaries of a target region to be located.

An example of an image 530 that has undergone radial intensity adjustment is shown with further reference to FIG.

5C. In general, radial intensity adjustment is optional and if performed, is performed prior to converting the image to a binary-colored image.

Figure 5D:
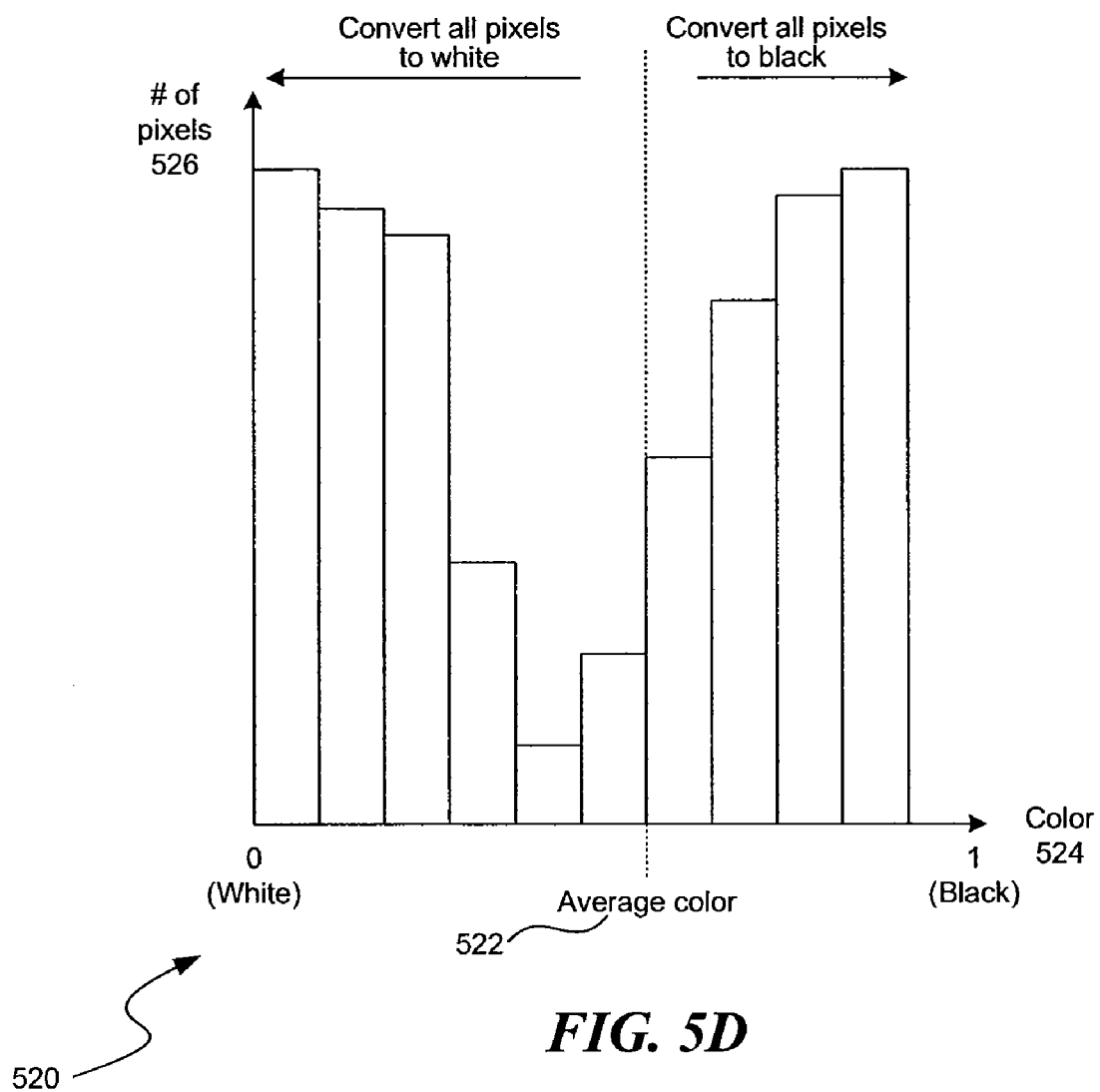
FIG. 5D depicts an example a color histogram used to determine an average color of an image to generate a binary-colored image.
Figure 5E:
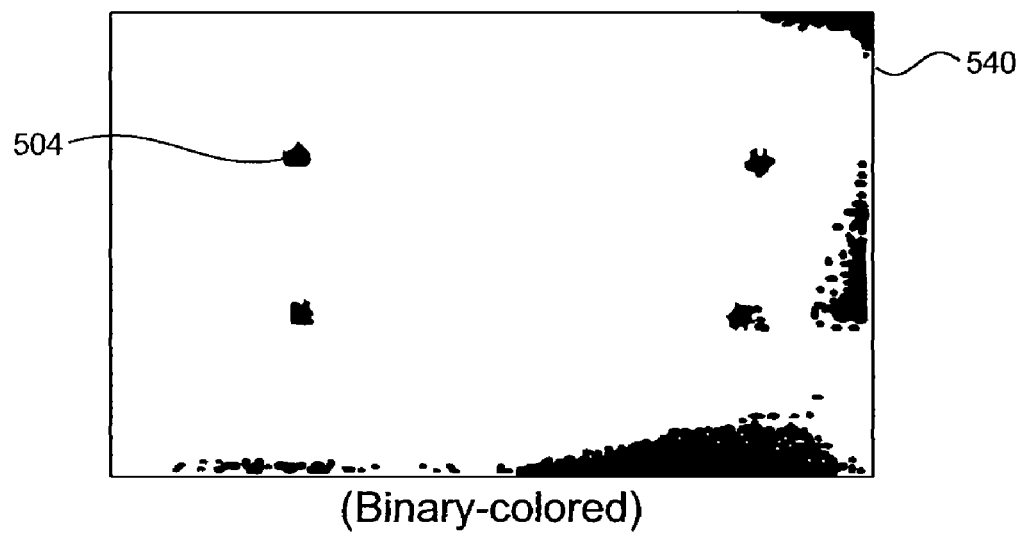
FIG. 5E depicts an example of a binary-colored image generated using the color histogram.
Figure 5F:
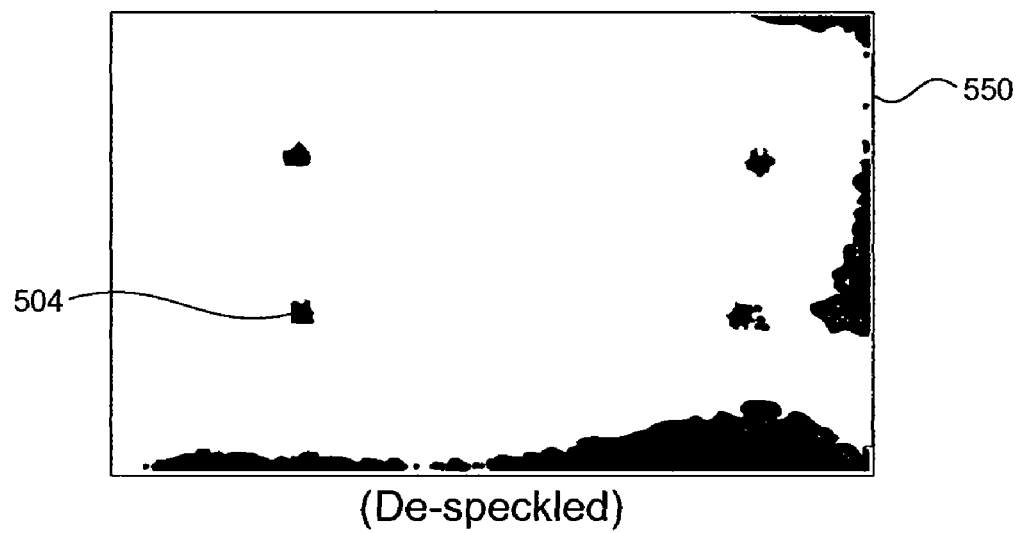
FIG. 5F depicts an example of the binary-colored image after de-speckling.

FIG. 5D depicts an example of a color histogram 520 used to determine an average color 522 of the image for generating a binary-colored image from the image.

The color histogram 520 shows the number of pixels 526 between various color ranges 524. The average color 522 can be computed to facilitate conversion of the image (e.g. a grey scale image) to a binary-colored (e.g., black and white) image. For example, a threshold value can be determined from the color histogram 520 and/or the average color 522. Alternatively or additionally, the system can identify a minimum between two maximums (zero first derivative), such as the valley in FIG. 5D, which becomes the threshold or dividing value between black/white or light/dark pixels. Therefore, the pixels with colors less than the threshold value or the average color 522 can be converted to one color (e.g., white) and pixels with colors greater than the threshold value or the average color 522 can be converted to another color (e.g., black). An example of an image 540 that has undergone color conversion to having binary colors is illustrated with further reference to FIG. 5E. FIG. 5F depicts an example of the binary-colored image 550 after de-speckling.

Figure 6A:
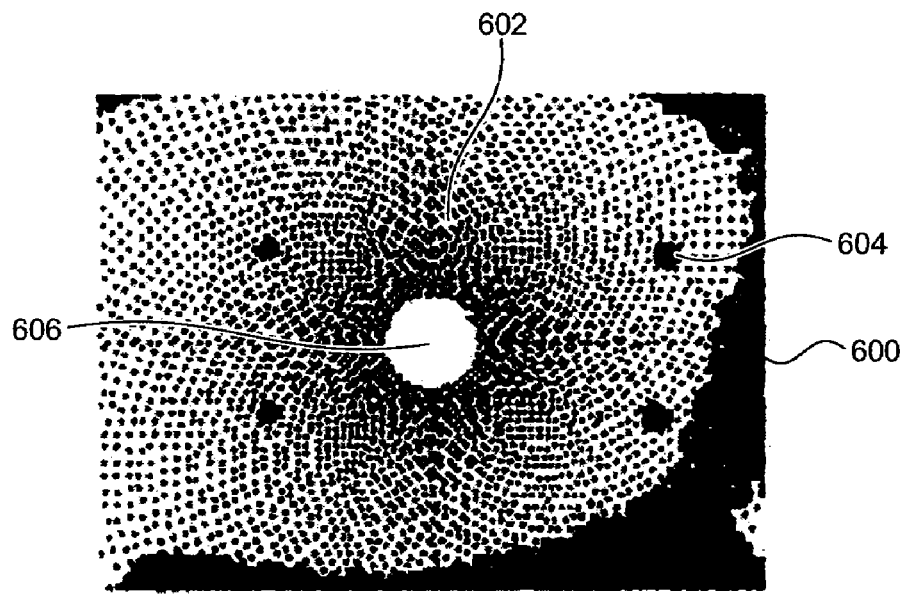
FIG. 6A depicts an example of a search pattern (e.g., a spiral search pattern) in the presence of four delimiters that define the boundaries of a target region in an image.

FIG. 6A depicts an example of a search pattern 602 in the presence of four delimiters 604 defining the boundaries of a target region in an image 600.

The search pattern 602 is omitted from a center portion 606 to optimize the number of search locations. The size/radius of the center portion 606 is, in one embodiment, determined based on the known size or approximate radius of the target region to expedite the search for delimiters 604.

Figure 6B:
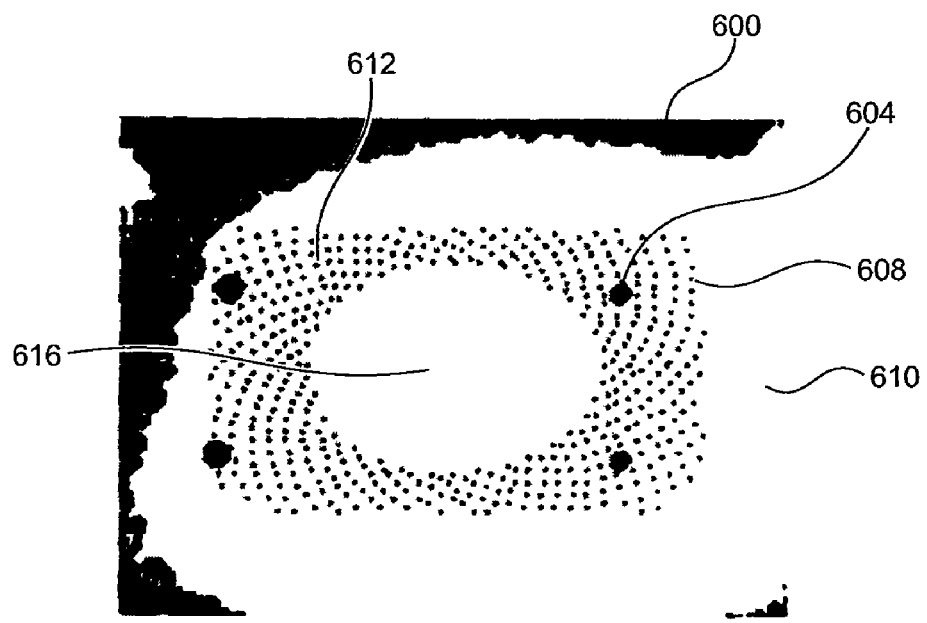
FIG. 6B depicts an example of a modified search pattern (e.g., a spiral search pattern) in the presence of four delimiters that define the boundaries of a target region in an image.

FIG. 6B depicts an example of a modified search pattern (e.g., a spiral search pattern) 602 in the presence of four delimiters 604 defining the boundaries of a target region in an image 600.

As shown, the search pattern 612 in FIG. 6B pattern has fewer search locations since the center portion 616 with no search locations is now enlarged. In addition, search locations are now also omitted from the edge portions 610 of the image 600. Thus, using the search pattern 612 of FIG. 6B, there are fewer pixels in the image 600 that correspond to search locations where the system checks for the delimiters 604, and thus the search pattern 612 of FIG. 6B may be analyzed more quickly. Note that quicker searches are generally performed at the risk of possibly missing a delimiter.

Figure 7A:
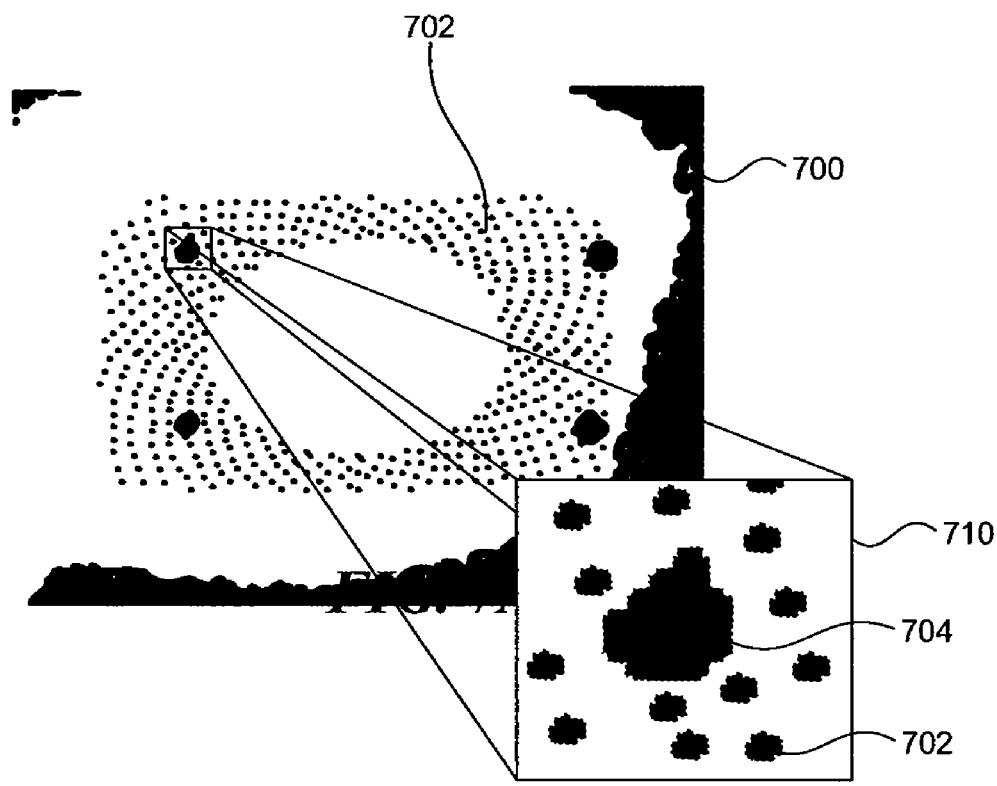
FIG. 7A-7B depict examples of a delimiter that has been located using the search pattern.
Figure 7B:
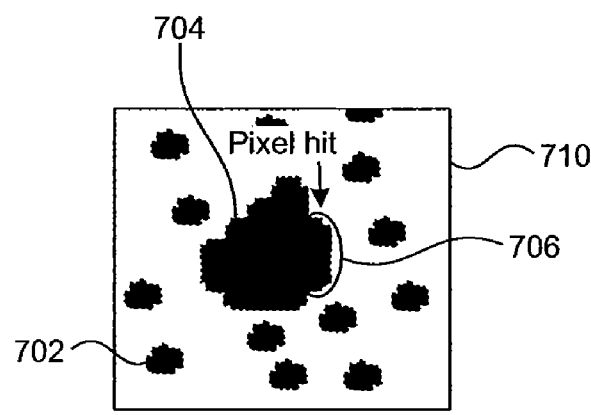

FIG. 7A-7B depict examples of a delimiter 704 in image 700 located using the search pattern 702.

Box 710 depicts a zoomed view of the delimiter 704 in the presence of the search pattern 702. When the color of a pixel that overlaps with a search location is dark or black, the weight is computed to determine whether the pixel is part of a delimiter. For example, when pixel 706 is detected as a dark or black pixel, the neighboring pixels are also analyzed to determine the weight.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C sec. 112, sixth paragraph, other aspects may likewise be embodied as a means-plus-function claim, or in other forms, such as being embodied in a computer-readable medium. (Any claims intended to be treated under 35 U.S.C. §112, å6 will begin with the words "means for".) Accordingly, the inventors reserve the right to add additional claims after filing the application to pursue such additional claim forms for other aspects of the disclosure.

I claim:

1. A method for automatically locating a signature field in a target region of a digital image captured by a barcode reader, the target region having boundaries defined by multiple graphical delimiters in the digital image, the method, comprising:
adjusting image quality of the digital image by performing the following steps:
(i) generating a binary-colored image from the digital image, wherein the binary-colored image comprises black pixels and white pixels; and
(ii) performing de-speckling to reduce noise by converting at least one speckle pixel in the binary-colored image to at least one white pixel;
generating a search pattern comprising multiple search locations that spatially correspond with pixels in the digital image;
determining a color of multiple search pixels in the binary-colored image that correspond or substantially correspond in location to the multiple search locations;
identifying at least one black pixel in the multiple search pixels as a candidate pixel that is a part of one of multiple graphical delimiters;
analyzing colors of neighboring pixels of the candidate pixel to compute a weight value of the candidate pixel; and
saving the candidate pixel as a located graphical delimiter of multiple graphical delimiters if the weight value of the candidate pixel exceeds or approximates a weight threshold.

2. The method of claim 1:
wherein, an area of the target region is such that a hand-written signature fits substantially or completely within the boundaries of the target region;
wherein, the darkness in color is decreased radially;
wherein, the digital image is converted to the binary-colored image by computing an average color or an average color range of the digital image;
wherein, a black pixel is identified as a speckle pixel when a specified number of neighboring pixels of the black pixel are white or fall within a color spectrum about a lighter shade;
wherein, the search pattern is a spiral search pattern;
wherein, one of the graphical delimiters has a different weight value than the other graphical delimiters.

3. The method of claim 1, further comprising: searching for additional graphical delimiters until each of multiple graphical delimiters have been located.

4. The method of claim 2, further comprising:
determining a current orientation of the signature field using the graphical delimiter having the different weight value;
in response to determining that the current orientation is not a desired orientation, performing a rotation such that the target region is oriented in the desired orientation;
de-skewing the target region; and
resizing the target region to a target size.

5. A method for identifying a target region in an image that is captured by an imaging device, the target region having boundaries defined by a set of discrete delimiters, the method, comprising:
generating a binary-colored image from the image, wherein the binary-colored image comprises darker-shaded pixels and lighter-shaded pixels;
identifying a speckle pixel from the binary-colored image;
removing the speckle pixel from the binary-colored image by converting the speckle pixel to a lighter-shaded pixel;
analyzing a color of a target pixel located at a search location and neighboring pixels of the target pixel to determine whether the target pixel corresponds with a discrete delimiter;
locating a portion of the set of discrete delimiters; and
identifying the target region using a portion of the set of discrete delimiters.

6. The method of claim 5, further comprising, decreasing darkness in color at or near edge portions of the image using radial adjustment prior to generating the binary-colored image.

7. The method of claim 5, wherein, the identifying the speckle pixel comprises: identifying a darker-shaded pixel having a predetermined number of neighboring pixels of color shades within a color spectrum.

8. The method of claim 5, further comprising:
generating a search pattern having a set of search locations that includes the search location;
wherein, the search pattern is generated based on a size of the image or an area of the target region.

9. The method of claim 5, further comprising:
analyzing colors of the neighboring pixels of the target pixel to compute a weight value of the target pixel; and
identifying and saving the target pixel as the discrete delimiter if the weight value is within a weight range or exceeds or approximates a weight threshold.

10. The method of claim 8, wherein, the target region is a signature field having rectangular boundaries and the area of the target region is such that a hand-written signature fits substantially or completely within the target region.

11. The method of claim 5, wherein, wherein, the darker-shaded pixels are substantially black and the lighter-shaded pixels are substantially white.

12. The method of claim 5, further comprising, computing an average color or an average color range of the image to generate the binary-colored image.

13. The method of claim 5:
wherein, the set of discrete delimiters includes four discrete delimiters; and
wherein, one of the set of discrete delimiters has a different weight value than the other discrete delimiters.

14. The method of claim 9, further comprising: searching for additional discrete delimiters until each of the set of discrete delimiters have been found.

15. The method of claim 5, further comprising:
determining an orientation of the target region as captured using the discrete delimiter having the different weight; and
in response to determining that the current orientation is not a desired orientation, performing a rotation such that the target region is oriented in the desired orientation;
de-skewing the target region; and
resizing the target region to a target size.

16. The method of claim 15, further comprising:
de-skewing the target region by determining a left height and a right height of the target region and collecting x-coordinate and y-coordinate data of a set of lines in the target region, the set of lines being along a length of the target region; and
resizing the target region to a target size defined by a target height and target width.

17. An apparatus for identifying a target region in an image, the target region having boundaries defined by a set of discrete delimiters, the apparatus, comprising:
a color converting module operable to generate a binary-colored image from the image, wherein the binary-colored image comprises first-shaded pixels and second-shaded pixels;
a delimiter module coupled to the color converting module, the delimiter module operable to analyze a color of a target pixel located at a search location and neighboring pixels of the target pixel to determine whether the target pixel is a portion of a discrete delimiter;
wherein the delimiter module is further operable to locate a portion of the set of discrete delimiters; and
a target region identifier module coupled to the delimiter module, the target region identifier module operable to identify the target region using the portion of the set of discrete delimiters.

18. The apparatus of claim 17, further comprising:
an image capture unit operable to capture the image, and
a speckle remover module coupled to the color converting module, the speckle remover module operable to identify a speckle pixel from the binary-colored image and to remove the speckle pixel from the binary-colored image by converting a color of the speckle pixel to a second-shaded pixel.

19. The apparatus of claim 17, wherein, the color converting module is further operable to decrease darkness in color at or near edge portions of the image using radial adjustment prior to generating the binary-colored image.

20. The apparatus of claim 17, further comprising:
a search pattern generator coupled to the speckle remover module, the search pattern generator module operable to generate a search pattern having a set of search locations that comprises the search location;
wherein, the search pattern is a spiral search pattern.

21. A system for automatically locating a signature field in a target region of an image captured by a barcode reader, the target region having rectangular boundaries defined by multiple graphical delimiters in the image, the method, comprising:
means for optionally decreasing darkness in color at or near edge portions of the image;
means for generating a binary-colored image from the image, wherein the binary-colored image comprises darker-shaded pixels and lighter-shaded pixels;
means for performing de-speckling by converting a speckle pixel in the binary-colored image to a lighter shade;
means for generating a search pattern comprising multiple search locations that spatially correspond with pixels in the image;
means for determining a color of multiple search pixels in the binary-colored image that correspond or substantially correspond in location to the multiple search locations;
means for identifying a darker-shaded pixel in the multiple search pixels as a candidate pixel that is a portion of one of multiple graphical delimiters;
means for analyzing colors of neighboring pixels of the candidate pixel to compute a weight value of the candidate pixel; and
means for saving the candidate pixel as a located graphical delimiter of multiple graphical delimiters if the weight value of the candidate pixel exceeds or approximates a weight threshold.

* * * * *

UNITED STATES PATENT AND TRADEMARK OFFICE
CERTIFICATE OF CORRECTION

| | | |
|---|---|---|
| PATENT NO. | : 8,300,928 B2 | Page 1 of 1 |
| APPLICATION NO. | : 12/359197 | |
| DATED | : October 30, 2012 | |
| INVENTOR(S) | : Ronald Van Der Putten | |

It is certified that error appears in the above-identified patent and that said Letters Patent is hereby corrected as shown below:

In the Specifications:

In column 10, line 4, delete "FIG. 4A-4B" and insert -- FIG. 4A-4B. --, therefor.

In column 17, line 3, delete "å6" and insert -- ¶6 --, therefor.

In the Claims:

In column 18, line 43, in claim 11, delete "wherein, wherein," and insert -- wherein, --, therefor.

Signed and Sealed this
Twenty-eighth Day of May, 2013

Teresa Stanek Rea
*Acting Director of the United States Patent and Trademark Office*